United States Patent [19]

Kawashima et al.

[11] Patent Number: 5,702,317

[45] Date of Patent: Dec. 30, 1997

[54] AUTOTENSIONER

[75] Inventors: Kazuki Kawashima; Sadaji Katogi; Yoshikazu Hida, all of Iwata, Japan

[73] Assignee: NTN Corporation, Osaka, Japan

[21] Appl. No.: 627,095

[22] Filed: Apr. 3, 1996

[30] Foreign Application Priority Data

Apr. 13, 1995 [JP] Japan .................................. 7-088327
Oct. 31, 1995 [JP] Japan .................................. 7-283801

[51] Int. Cl.$^6$ ................................................ F16H 7/08
[52] U.S. Cl. ................................ 474/110; 474/112; 474/135
[58] Field of Search ........................... 474/110, 112, 474/117, 135

[56] References Cited

U.S. PATENT DOCUMENTS

| | | | |
|---|---|---|---|
| 4,904,230 | 2/1990 | Kawashima et al. | 474/135 X |
| 5,186,689 | 2/1993 | Yamamoto et al. | 474/112 |
| 5,186,690 | 2/1993 | Yamamoto | 474/135 |
| 5,328,415 | 7/1994 | Furutani et al. | 474/135 X |
| 5,399,124 | 3/1995 | Yamamoto et al. | 474/135 X |

*Primary Examiner*—Roger J. Schoeppel
*Attorney, Agent, or Firm*—Wenderoth, Lind & Ponack

[57] ABSTRACT

An arrangement which can reduce the space between a tension pulley of an autotensioner and an engine block and thus reduce the installation space of an autotensioner. A sub-reservoir is provided at the side of a plunger of a hydraulic damper. The hydraulic damper is arranged between the tension pulley and the engine block so that it is received inside the outer periphery of the tension pulley with its plunger abutting a pin of an eccentric ring. It is thus possible to reduce the space between the tension pulley and the engine block.

7 Claims, 11 Drawing Sheets

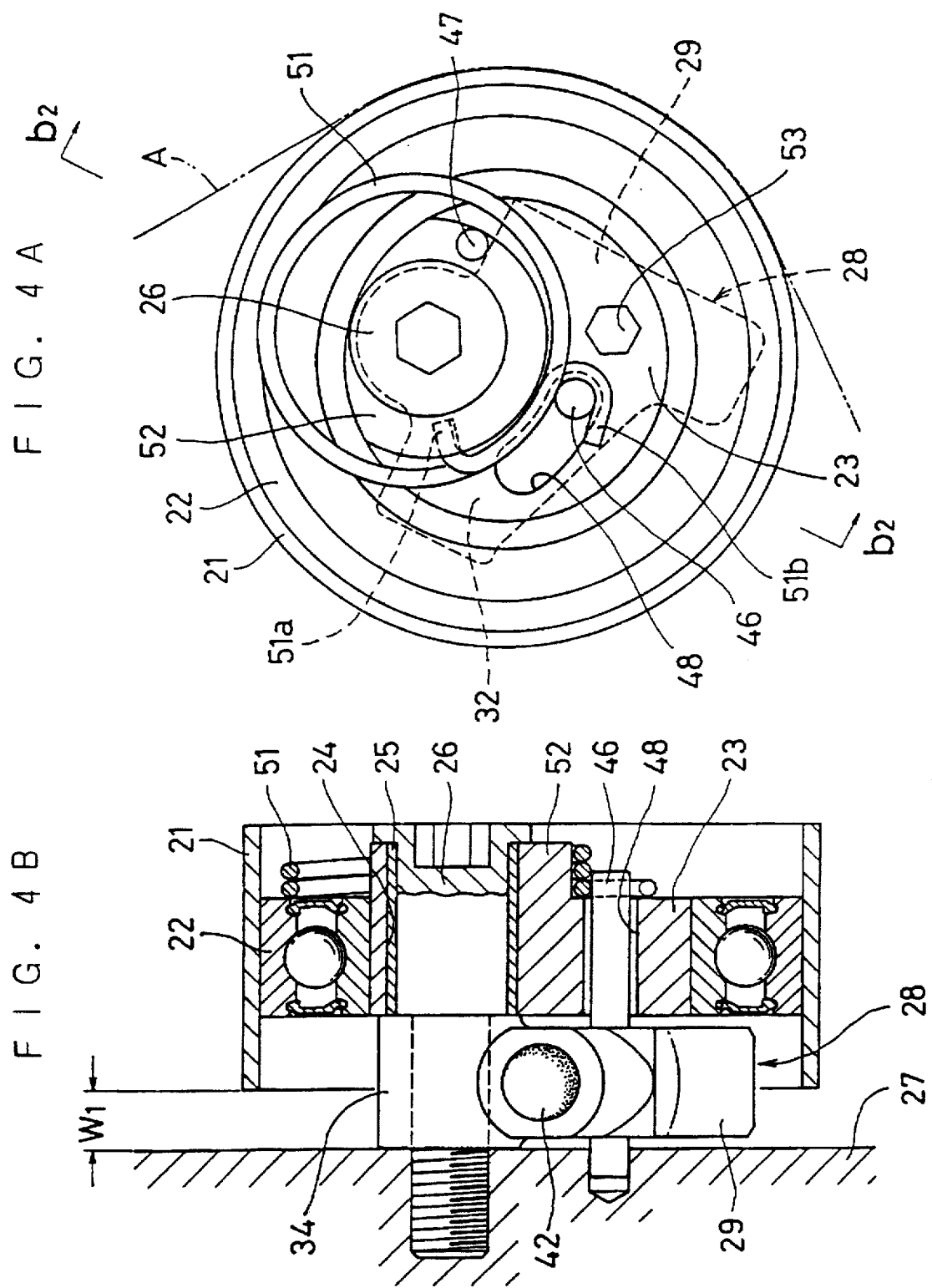

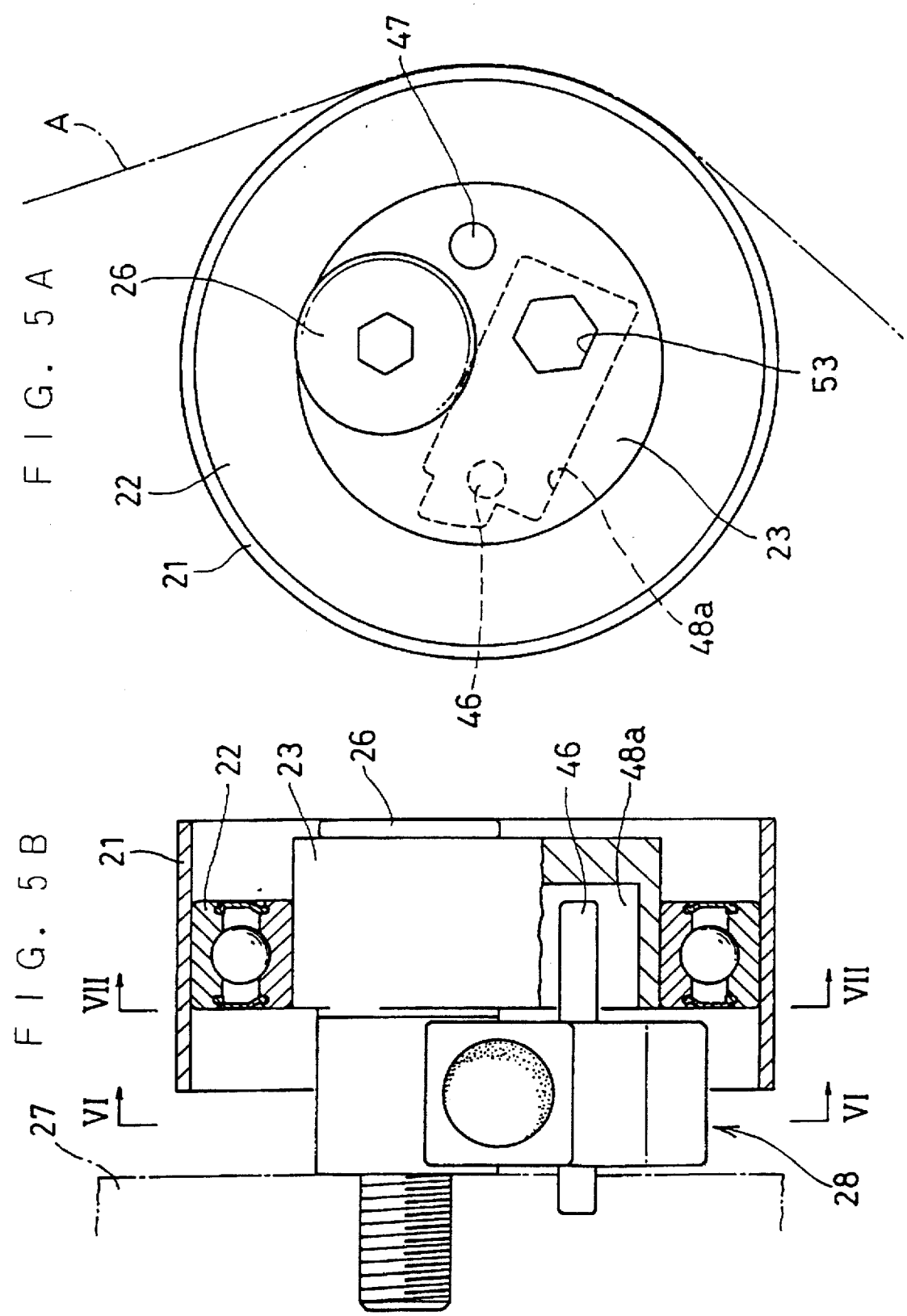

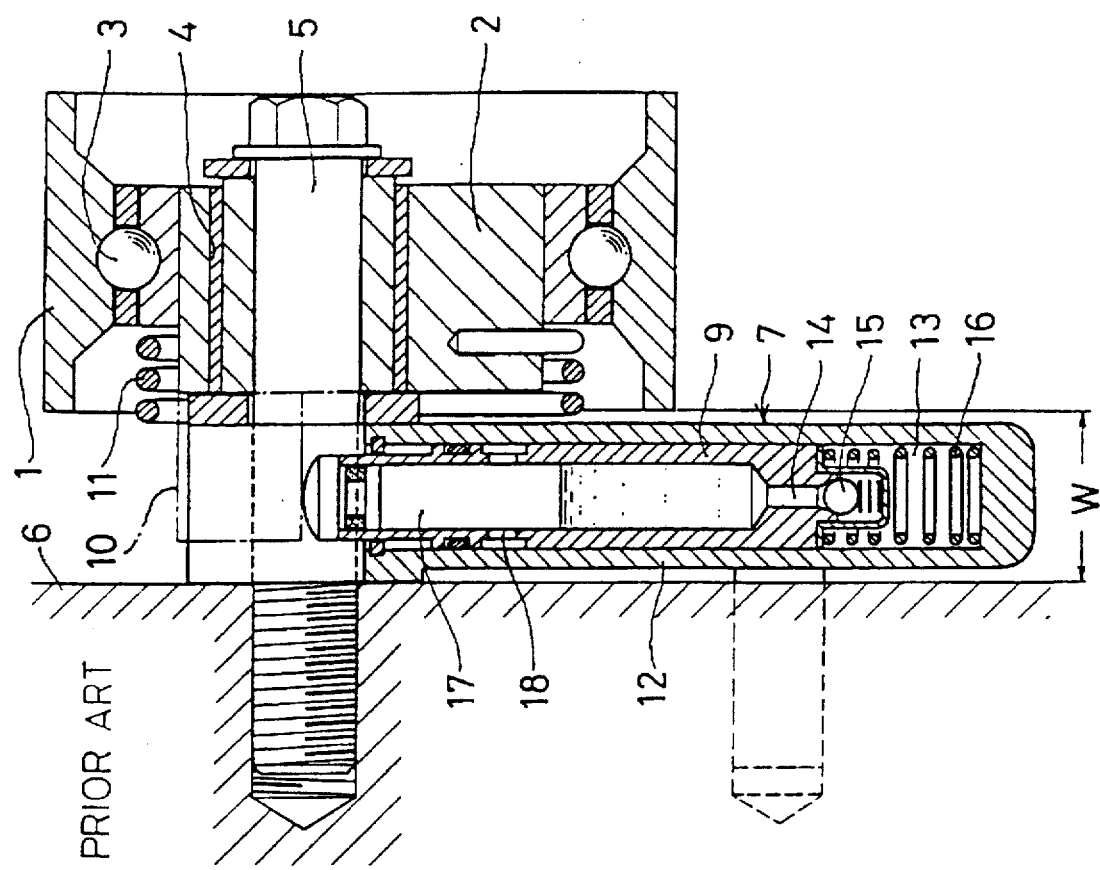
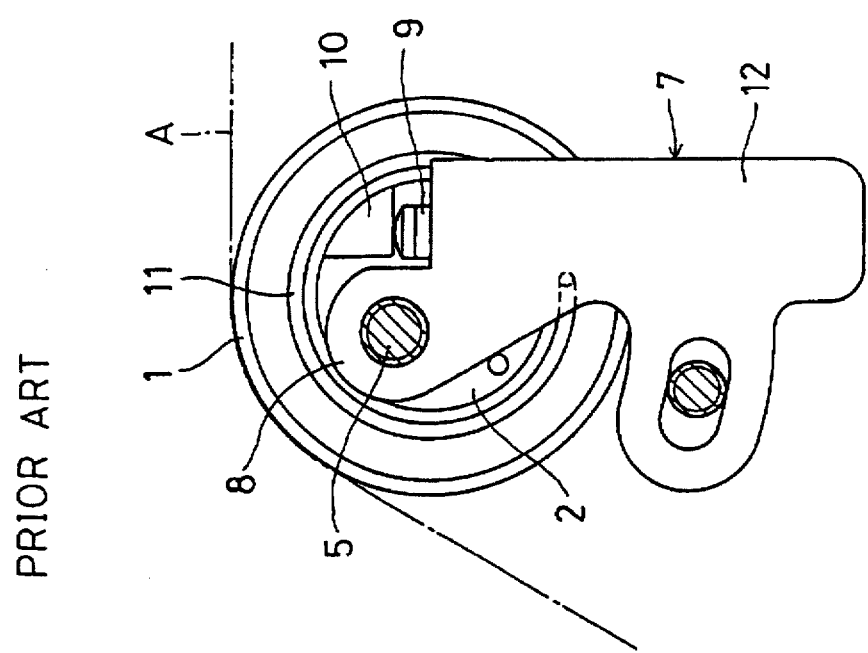
FIG. 12A PRIOR ART
FIG. 12B PRIOR ART 5,702,317

1

AUTOTENSIONER

BACKGROUND OF THE INVENTION

The present invention relates to an autotensioner for adjusting the tension in an automotive timing belt, and particularly to a compact autotensioner.

FIGS. 12A and 12B show an autotensioner the applicant proposed in Unexamined Japanese Utility Model Publication 2-56950. It includes a hydraulic damper and a tension pulley provided as one integral unit. The use of the hydraulic damper increases the damping capacity of the autotensioner.

This autotensioner has a tension pulley 1 rotatably mounted around an eccentric ring 2 through a bearing 3. A fixing bolt 5 extending through an eccentric hole 4 of the eccentric ring 2 is fixed to an engine block 6. A hydraulic damper 7 is fixedly mounted between the tension pulley 1 and the engine block 6 with its mounting portion 8 at the tip coupled to the fixing bolt 5 and the top end of its plunger 9 in abutment with a protrusion 10 on the eccentric ring 2. A torsion coil spring 11 is provided between the eccentric ring 2 and the hydraulic damper 7 with its one end fastened to the eccentric ring 2 and the other end to the hydraulic damper 7.

The hydraulic damper 7 has a damper cylinder 12. A hollow plunger 9 is axially movably received in the cylinder 12. A pressure chamber 13 is defined in the cylinder 12 under the plunger 9. The plunger 9 has a hole 14 in its bottom wall through which the pressure chamber 13 communicates with the space in the plunger 9. A check valve 15 is provided at the bottom opening of the hole 14. A return coil spring 16 is mounted in the pressure chamber in a compressed state so as to bias the plunger 9 upward.

The space in the plunger 9 (reservoir chamber 17) has its lower half portion filled with a hydraulic oil and the upper half portion with air. When the tension in a belt A increases and the plunger 9 is pushed by the belt A, hydraulic oil in the pressure chamber 13 will flow through a gap between the damper cylinder 12 and the plunger 9 and an upper hole 18 into the reservoir chamber 17. When the belt A slackens, the plunger 9 rises, opening the check valve 15. Hydraulic oil now flows from the reservoir chamber 17 into the pressure chamber 13.

In this arrangement, since the space in the plunger 9 is used as the reservoir chamber 17, it is impossible to reduce the entire length of the hydraulic damper without reducing the volume of the reservoir chamber. If the volume of the reservoir chamber is too small, air in the reservoir chamber 17 may flow into the pressure chamber 13.

Thus, it is impossible to sufficiently reduce the entire length of the hydraulic damper 7, so that it inevitably protrudes outwardly from the outer periphery of the tension pulley 1 as shown in FIGS. 12A and 12B. Since the damper 7 cannot be housed inside the tension pulley 1, it is necessary to provide a space W of at least about 15 mm between the tension pulley 1 and the engine block 6 in order to mount the damper 7 therebetween.

Moreover, since the torsion coil spring 11 is also provided between the hydraulic damper 7 and the eccentric ring 2, it would be difficult to mount even a very small, compact hydraulic damper 7 inside the outer periphery of the tension pulley 1.

An object of the present invention is to provide an autotensioner having a hydraulic damper so compact that it can be received inside the tension pulley, whereby the space between the engine block and the tension pulley can be minimized.

2

SUMMARY OF THE INVENTION

According to the present invention, there is provided an autotensioner comprising an eccentric ring, a tension pulley rotatably mounted on the eccentric ring for supporting a belt, a tension adjusting spring for urging the eccentric ring so as to pivot it in one direction, and a hydraulic damper including a damper cylinder having a pressure chamber and a reservoir chamber, a pressure receiving member in engagement with the eccentric ring for damping the rotary motion of the eccentric ring when the tension in the belt increases, and a check valve provided between the pressure chamber and the reservoir chamber. The hydraulic damper is arranged inside the outer periphery of the tension pulley Other features and objects of the present invention will become apparent from the following description made with reference to the accompanying drawings, in which:

BRIEF DESCRIPTION OF THE DRAWINGS

FIG. 4A is a front view of a third embodiment;

FIG. 4B is a vertical sectional view taken along line b2—b2 of FIG. 4A;

FIG. 5A is a front view of a fourth embodiment of the present invention;

FIG. 5B is a vertical sectional side view of the fourth embodiment;

FIG. 12A is a vertical sectional view of a conventional autotensioner; and

FIG. 12B is a cross-section of a hydraulic damper of the conventional autotensioner.

DETAILED DESCRIPTION OF THE PREFERRED EMBODIMENT

The embodiments are described with reference of the drawings.

(FIRST EMBODIMENT)

Figure 1A:
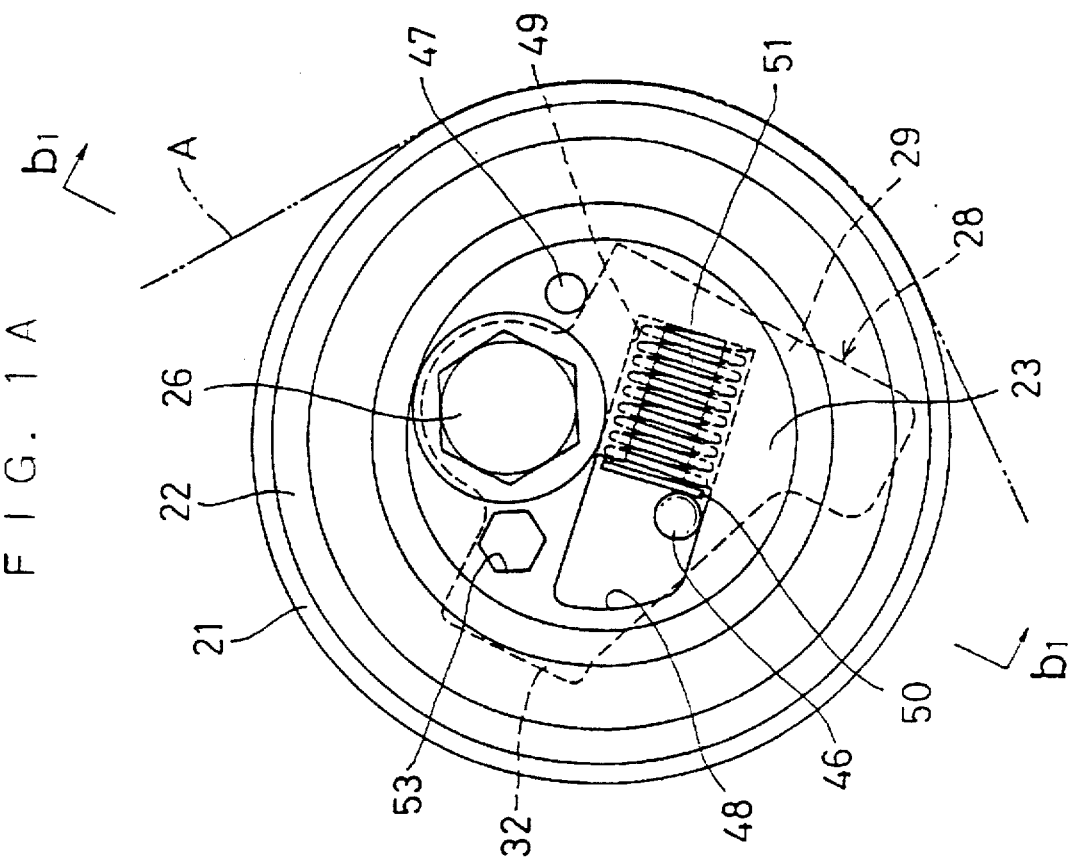
FIG. 1A is a front view of a first embodiment of the autotensioner according to the present invention.
Figure 1B:
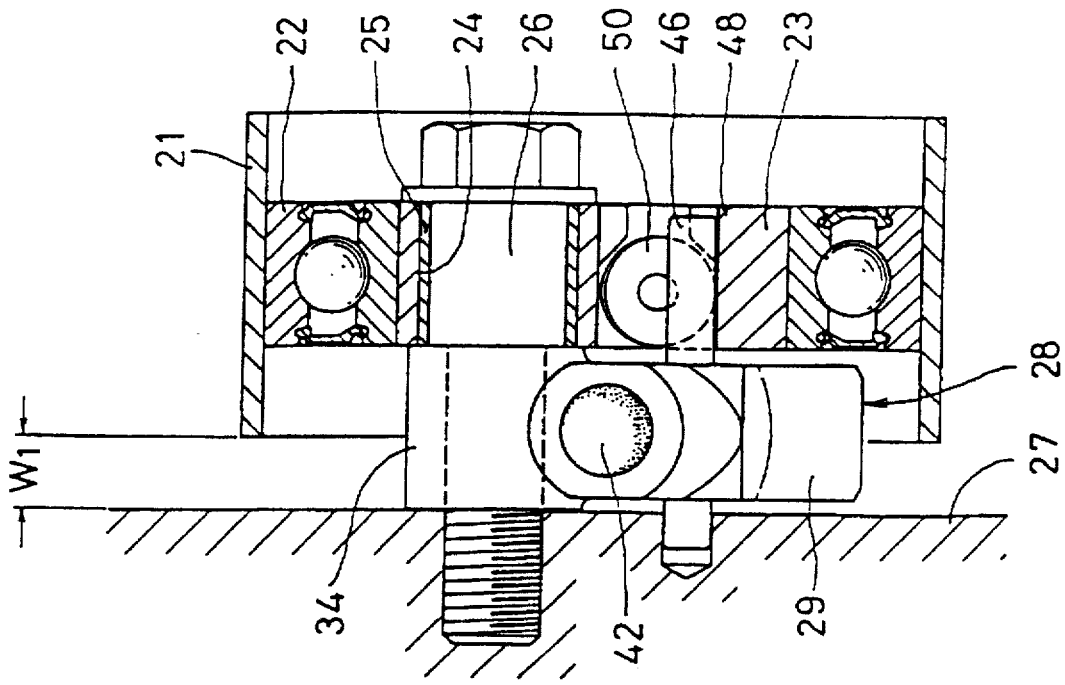
FIG. 1B is a vertical sectional view taken along line b1—b1 of FIG. 1A.
Figure 2:
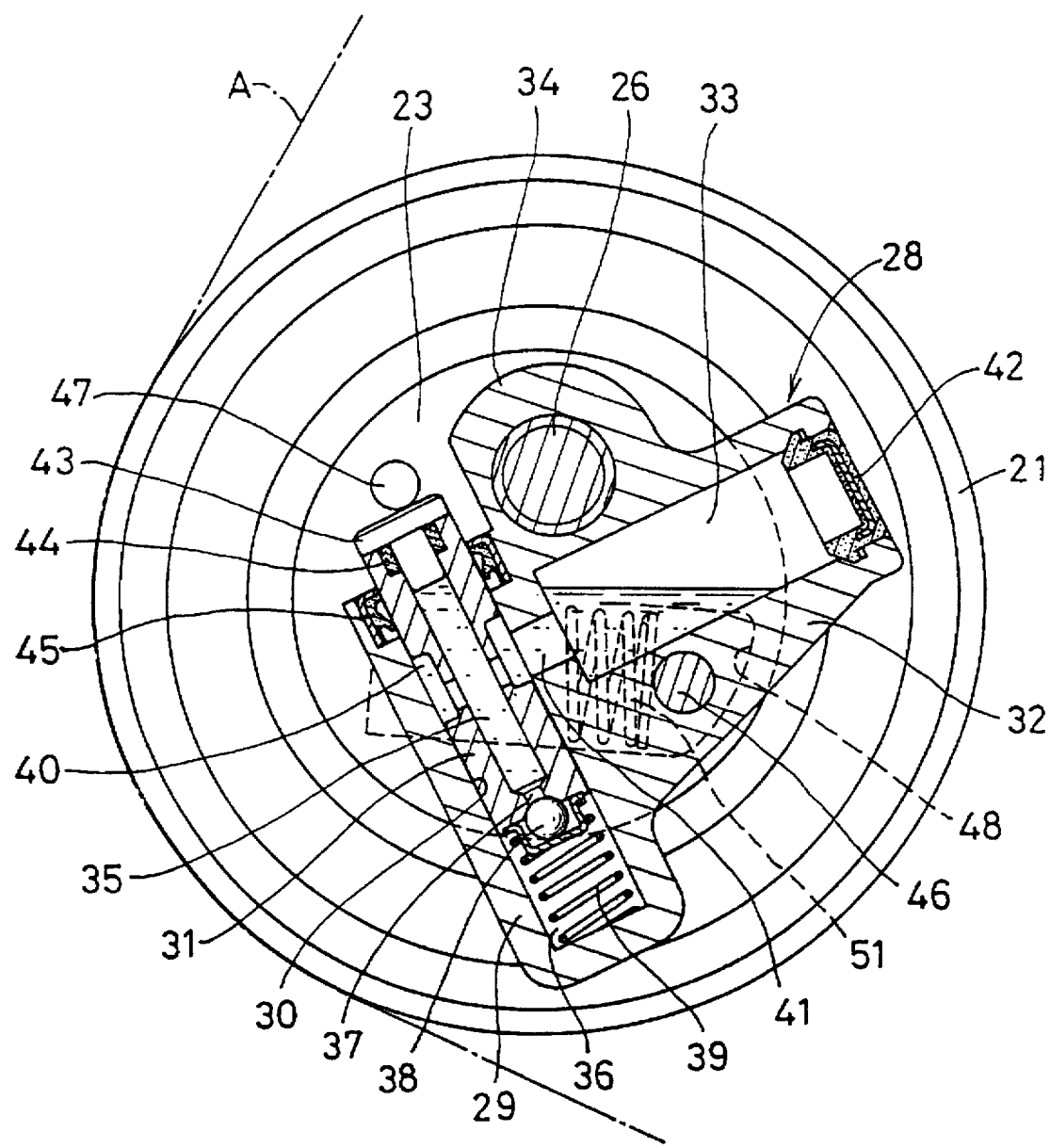
FIG. 2 is a vertical sectional view of a hydraulic damper of the first embodiment of the autotensioner.

In the first embodiment shown in FIGS. 1 and 2, a tension pulley 21 is rotatably mounted around an eccentric ring 23 through a rolling bearing 22. A fixing bolt 26 extending through a slide bearing 25 fitted in an eccentric hole 24 formed in the eccentric ring 23 is fixed to an engine block 27. A hydraulic damper 28 is mounted between the eccentric ring 23 and the engine block 27 so as to be located entirely inside the outer periphery of the tension pulley 21.

As seen in FIG. 2, the hydraulic damper 28 is arranged in a side-by-side relation with the tension pulley 21, and includes a damper cylinder 29 having an obliquely upwardly extending fluid chamber 30 and a plunger 31 axially slidably mounted in the fluid chamber 30. The damper cylinder 29 has a protrusion 32 integrally provided on one side thereof and having a sub-reservoir 33 and a mounting portion 34 provided over the sub-reservoir 33.

The plunger 31 has an axially extending reservoir chamber 35 and a hole 37 through which the reservoir chamber 35 communicates with a pressure chamber 36 defined at the lower portion of a fluid chamber 30 by the plunger 31. A check valve 38 is provided at the bottom opening of the hole 37. A return coil spring 39 for the plunger 31 is mounted in the pressure chamber 36 in a compressed state.

A peripheral groove 40 is formed in the outer periphery of the plunger 31 at its intermediate portion. The groove 40 communicates with the reservoir chamber 30. The sub-reservoir 33 extends perpendicular to the fluid chamber 30 and is in communication with the peripheral groove 40 by way of a passage 41. The passage end is closed by a rubber cap 42. A head 43 is positioned on the top end of the plunger 31 to hermetically seal the open top of the reservoir chamber 35 in cooperation with an O-ring 44. The open top of the fluid chamber 30 is sealed by an oil seal 45.

Hydraulic oil fills the reservoir chamber 35 and pressure chamber 36 and part of the sub-reservoir 33. The upper part of the sub-reservoir 33 is filled with air. As shown in FIGS. 1B and 2, the fixing bolt 26 extends through the mounting portion 34 of the hydraulic damper 28. A fixing pin 46 extending through the protrusion 32 is fixed to the engine block 27 so that the damper 28 is fixed with the sub-reservoir 33 in an oblique position. The amount of hydraulic oil in the sub-chamber 33 is adjusted so as not to touch the rubber cap 42 in this state. The head 43 of the plunger 31 abuts a pin 47 provided on the eccentric ring 23.

The provision of the sub-reservoir 33 at the side of the fluid chamber 30 makes it possible to reduce the entire length of the plunger 31 without reducing the total volume of the reservoir chambers. Thus, it is possible to reduce the size of the entire hydraulic damper 28 to such an extent that the entire damper can be placed inside the outer periphery of tension pulley 21. This in turn makes it possible to reduce the space W1 between the tension pulley 21 and the engine block 27.

Figure 3:
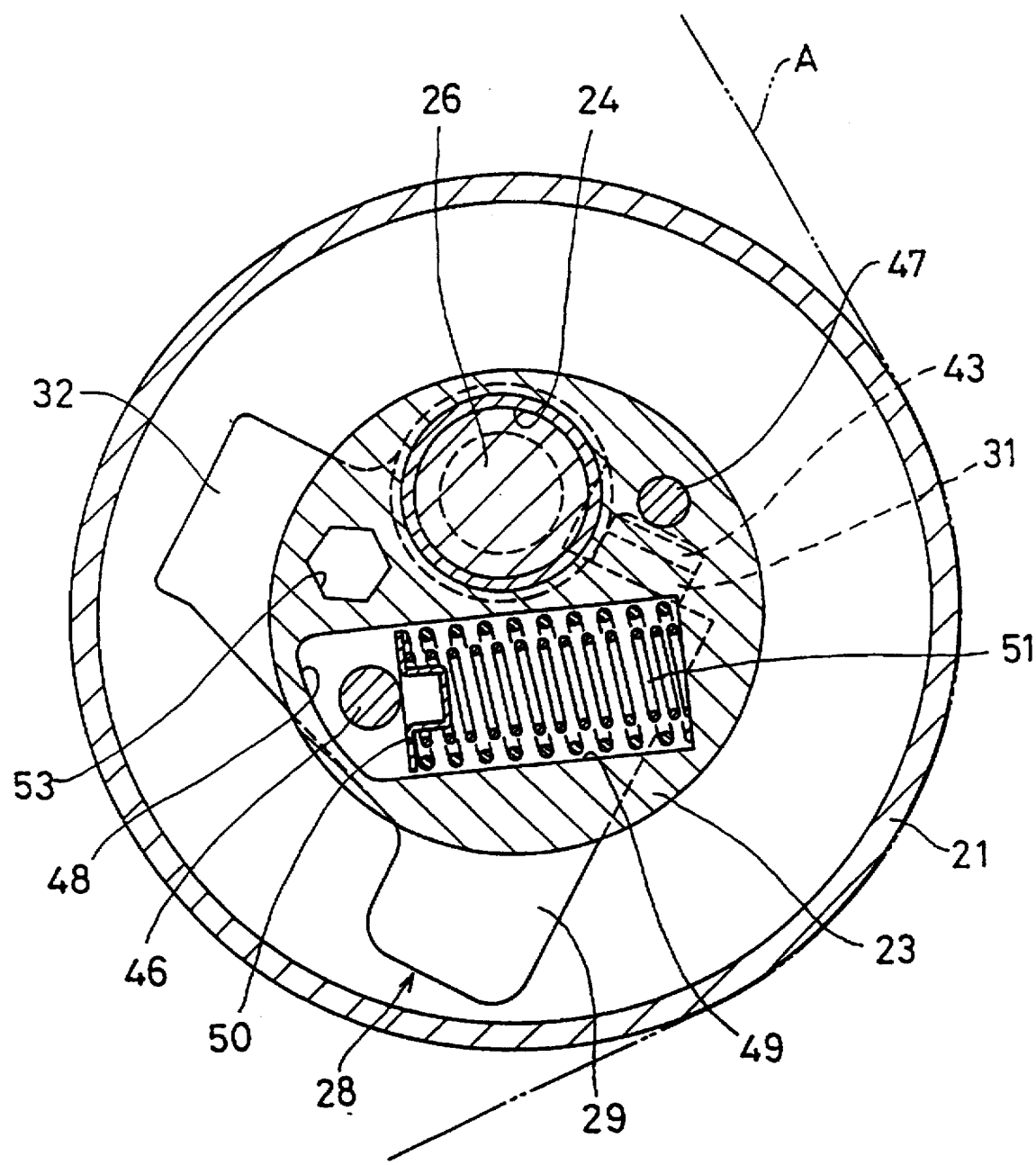
FIG. 3 is a vertical sectional view of a tension adjusting spring of a second embodiment.

The eccentric ring 23 supporting the tension pulley 21 is formed with a window 48 in which is loosely fitted the fixing pin 46, and a hole 49 contiguous with the window 48 (FIG. 3). A tension adjusting spring 51 is mounted in the hole 49 in a compressed state with one end thereof abutting a spring seat 50 supported on the fixing pin 46. The spring 51 biases the eccentric ring 23 to pivot it around the fixing bolt 26 so as to increase the tension in the belt A.

(SECOND EMBODIMENT)

A single-coil spring is used as the tension adjusting spring 51 in the first embodiment shown in FIG. 1A. In the second embodiment shown in FIG. 3, a double-coil spring is used instead.

(THIRD EMBODIMENT)

In the third embodiment shown in FIGS. 4A and 4B, a torsion coil spring is used as the tension adjusting spring 51.

It is mounted around a protrusion 52 provided around the fixing bolt 26 on the eccentric ring 23 with its one end 51a coupled to the protrusion 52 and the other end 51b to the fixing pin 46. It biases the eccentric ring 23 so as to pivot in a direction to increase the tension in the belt A.

In the above embodiments, the torsion adjusting spring 51 is provided inside the eccentric ring 23 or mounted on the outer side of the eccentric ring 23. Namely, it does not exist in the space between the tension pulley 21 and the engine block 27, so that it is possible to sufficiently reduce the space W1.

In any of the embodiments, a hexagonal hole 53 is formed in the eccentric ring 23. The autotensioner is set in its operative state by pushing in the plunger 31 by turning the eccentric ring 23 with a hexagon wrench inserted in the hexagonal hole 53, engaging the belt A on the pulley 21, and removing the wrench from the hole 53 to let the pulley 21 move to bias the belt A.

Now in operation of the autotensioners of the first to third embodiments, when the tension in the belt A increases in the state shown in FIG. 2, the tension pulley 21 and the eccentric shaft 23 turn counterclockwise about the fixing bolt 26. The plunger 31 is thus pushed in by the pin 47.

As the plunger 31 is pushed in, hydraulic oil in the pressure chamber 36 leaks through a narrow gap between the plunger 31 and the wall surface of the fluid chamber 30 into the peripheral groove 40, thus damping the movement of the plunger 31. The hydraulic oil in the peripheral groove 40 flows through the passage 41 into the sub-reservoir 33.

The plunger 31 stops when the tension in the belt A balances with the force of the tension adjusting spring 51.

When the tension in the belt A begins to decrease, the tension pulley 21 and the eccentric ring 23 turn clockwise in FIG. 2. The tension pulley 21 will stop pivoting when the force of the tension adjusting spring 51 balances with the tension in the belt A.

As the tension pulley 21 pivots in this direction, the pin 47 of the eccentric ring 23 moves away from the plunger 31. The plunger 31 thus rises following the pin 47, urged by the return coil spring 39.

With this movement of the plunger, the hole 37 is opened by the check valve 38. Hydraulic oil in the reservoir chamber 35 will thus flow into the pressure chamber 36, while hydraulic oil in the sub-reservoir 33 flows into the reservoir chamber 35. The plunger 31 can thus quickly rise following the movement of the pin 47.

(FOURTH EMBODIMENT)

Figure 6A:
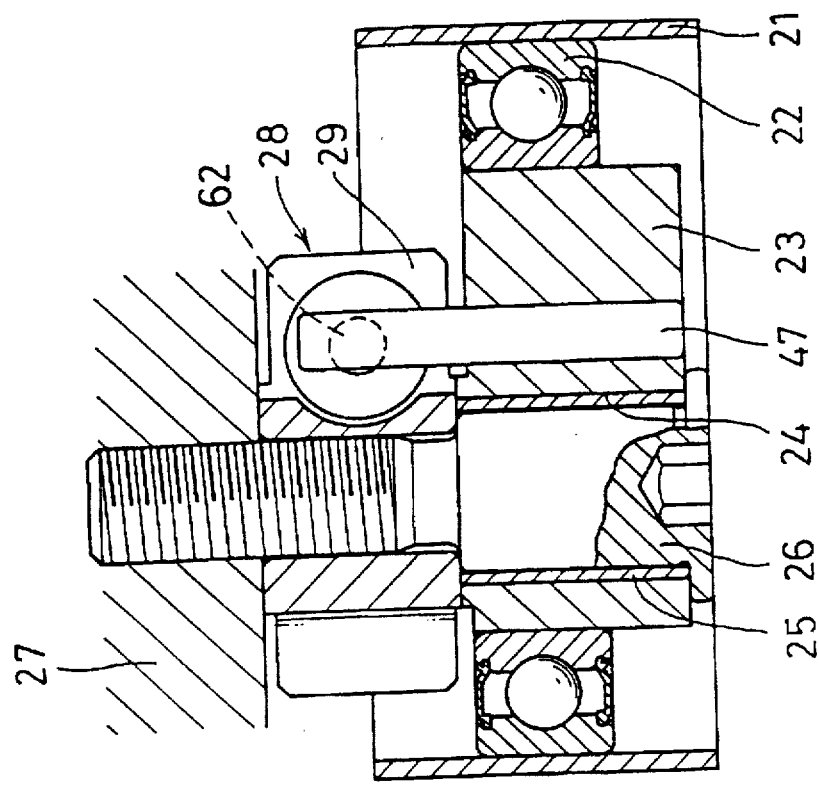
FIG. 6A is a plan view in cross-section of the embodiment illustrated in FIG. 5A.

FIGS. 5 to 7 show the fourth embodiment. In this embodiment, the plunger of the hydraulic damper is made up of two separate members, i.e. a rod and a plunger, to further reduce the size of the damper. In this and the following embodiments, the same elements as in the first to third embodiments are denoted by the same numerals and their description is omitted.

More specifically, the hydraulic damper 28 of the fourth embodiment has a plunger 61 axially slidably received in a damper cylinder 29. A straight rod 62 protrudes from an open end of the cylinder 29, so that this damper can be manufactured and assembled more easily. The rod 62 is axially movably guided by a wear ring 63 (FIG. 7B) provided in the cylinder 29.

The inner end of the rod 62 abuts a tapered recess formed in the inner-diameter surface of the plunger 61. Two or more oil grooves 64 are formed in the tapered recess, contiguous with the hole 37. The reservoir chamber 35 is defined between the plunger 61 and the wear ring 63.

The wear ring 63 is loosely set in the cylinder 29 by press-fitting. It prevents chips originating from the cylinder 29 and the wear ring 63 from mixing into hydraulic oil. The open end of the cylinder 29 is sealed by an oil seal 65 having its inner periphery in close contact with the rod 62.

An annular groove 66 is formed in the inner periphery of the cylinder 29 at its portion in contact with the oil seal 65 to prevent the loosely inserted wear ring 63 and the oil seal 65 from coming out of the cylinder.

The damper cylinder 29 is made of steel. A return coil spring 39 for the plunger is mounted in a pressure chamber 36 defined in the cylinder 29 near its inner end. It is tapered so that air in the pressure chamber 36 can smoothly escape into the reservoir chamber 35.

The reservoir chamber 35 and a sub-reservoir 33 provided at the side of the chamber 35 communicate with each other through a passage 41 (FIG. 7B), which is connected to the upper part of the sub-reservoir 33 so that air can smoothly flow from the reservoir chamber 35 to the sub-reservoir 33.

The damper cylinder 29 is pivotally mounted on the fixing bolt 26 with the protruding end of the rod 62 abutting the pin 47 provided on the eccentric ring 23. One or both of the pin 47 and the rod 62 are hard chrome-plated, soft-nitrided, or otherwise subjected to surface hardening treatment. To reduce their wear, a rolling member 67 may be mounted on the pin 47 so as to be brought into rolling contact with the rod 62.

Figure 6B:
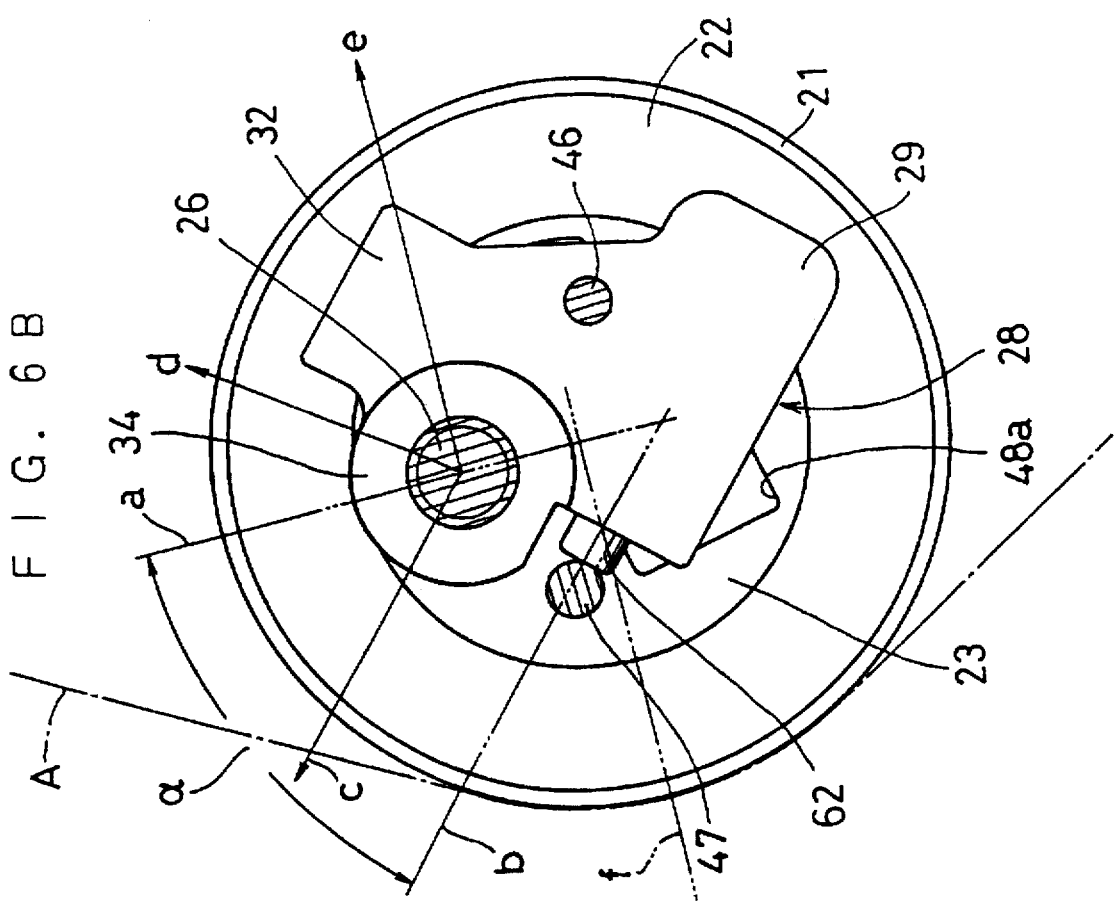
FIG. 6B is a vertical sectional view taken along line VI—VI of FIG. 5B.

As shown in FIG. 6B, the damper cylinder 29 is set inside the pulley 21 so that the line a connecting the fixing bolt 26 as the pivoting center of the eccentric ring 23 to the center of the pulley 21 forms an angle $\alpha$ of 30° to 90° with respect to the axis b of the rod 62 of the damper cylinder 29, i.e. the moving direction of the rod 62. With the angle $\alpha$ set in this range, the line a forms an angle of 0° to 60° with respect to the bisector f of the winding angle of the belt A (center of belt load). With this arrangement, the damper force c, the load d on the pivoting center (which is the sum of the load applied from the belt and the damper force), and the load e from the belt are dispersed in three directions, so that the load on the fixing bolt 26 as the pivoting center can be reduced.

Figure 7A:
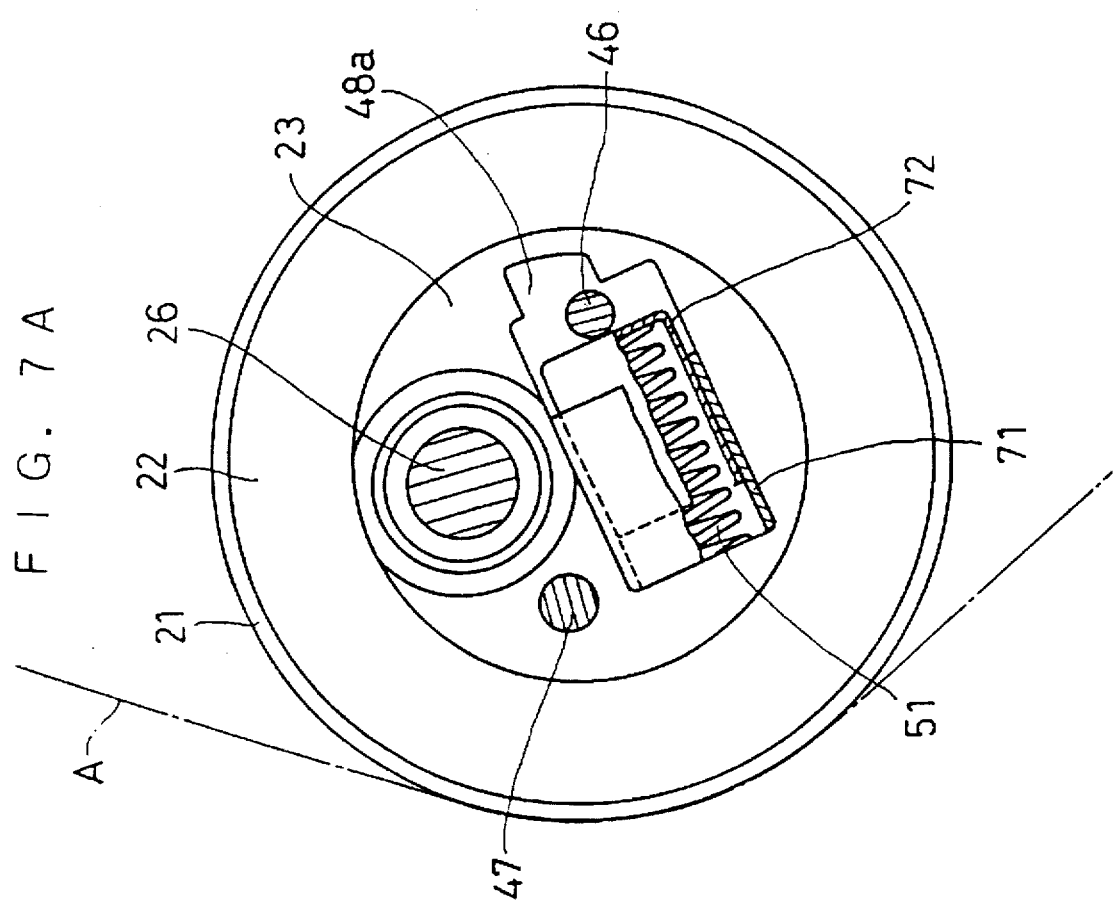
FIG. 7A is a vertical sectional view taken along line VII—VII of FIG. 5B.
Figure 7B:
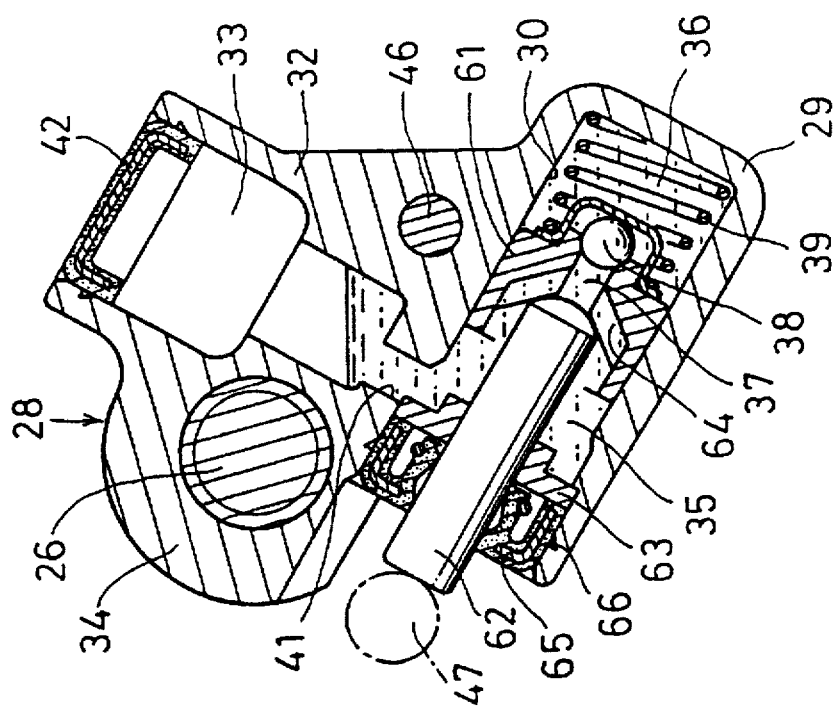
FIG. 7B is a vertical sectional view of its a hydraulic damper.
Figure 8:
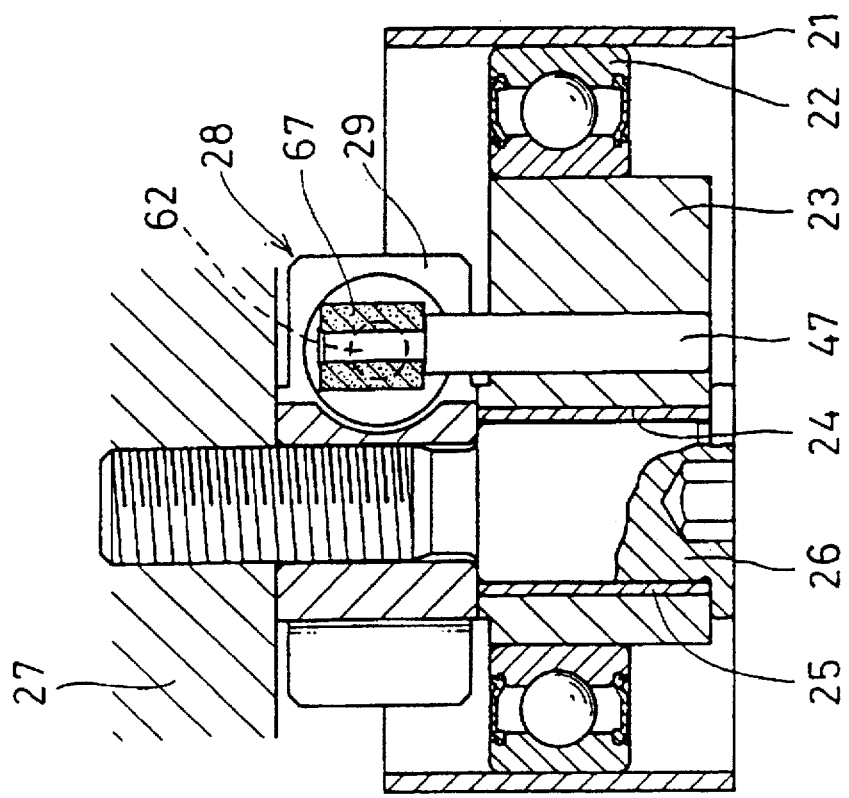
FIG. 8 is a vertical sectional view of an embodiment in which a rolling member is used at the portion where a rod of the hydraulic damper abuts.

FIG. 7A shows a mechanism for imparting to the eccentric ring 23 a force to pivot it about the fixing bolt 26 in such a direction that the tension in the belt A increases. This mechanism comprises a cylindrical slide member 71 made of a synthetic resin and mounted in a recess 48a formed in the eccentric ring 23, a tension adjusting spring 51 mounted in the slide member 71, and a cap 72 inserted in the slide member 71 so as to be axially movable relative to the slide member 71 and abutting the fixing pin 46.

(FIFTH EMBODIMENT)

Figure 9:
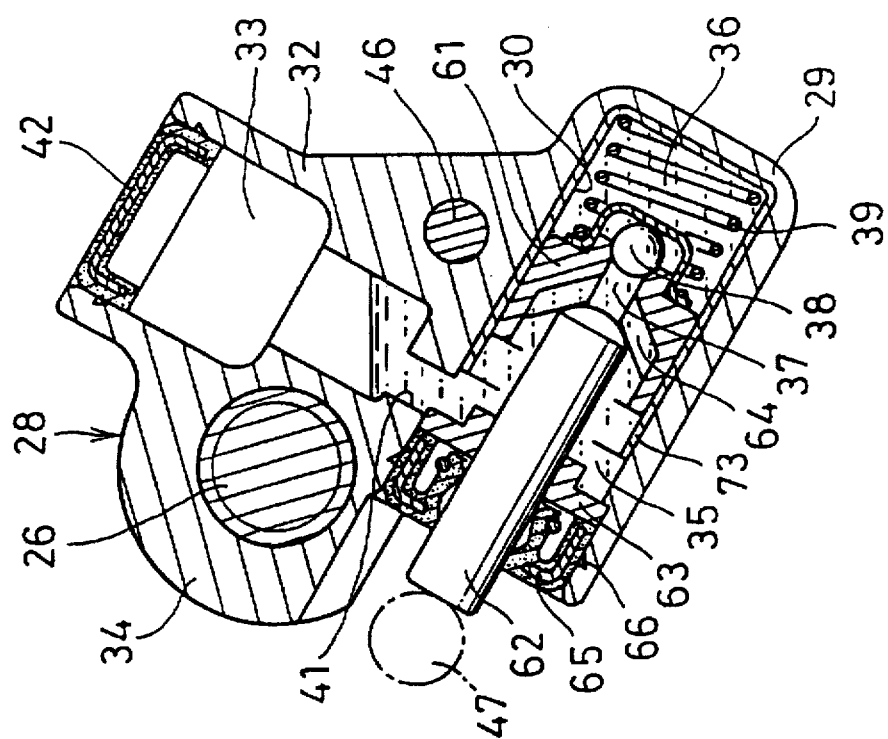
FIG. 9 is a vertical sectional view of a fifth embodiment of the present invention.

FIG. 9 shows a hydraulic damper 28 of the fifth embodiment. It is essentially the same as the fourth embodiment except that the damper cylinder 29 is made of an aluminum alloy, and that the pressure chamber 36 is defined in a steel sleeve 73 mounted in the cylinder 29 so as to be in sliding contact with the plunger 61.

(SIXTH EMBODIMENT)

Figure 10:
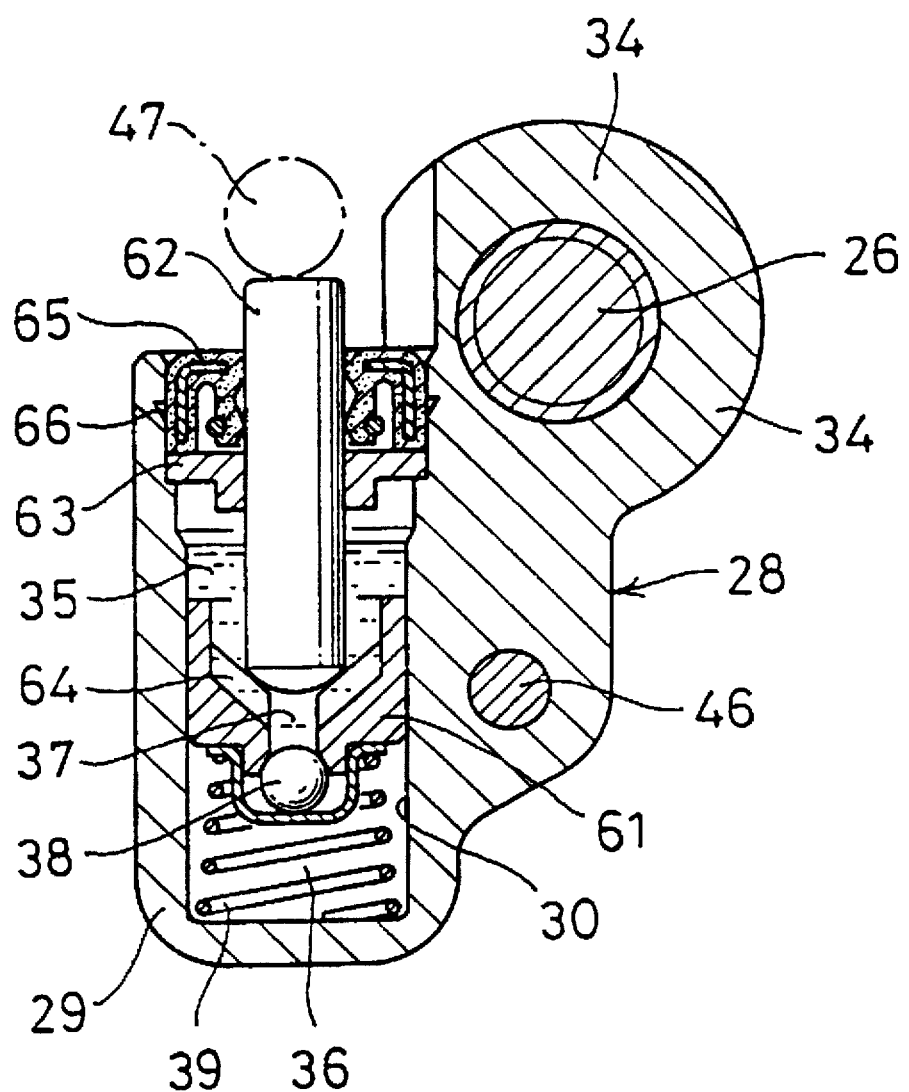
FIG. 10 is a vertical sectional view of a sixth embodiment of the present invention.

In the sixth embodiment shown in FIG. 10, the sub-reservoir 33 used in the fourth embodiment is omitted to further reduce the size of the damper cylinder 29. The upper part of the reservoir chamber 35 in the damper cylinder 29 is used as an air chamber.

Some autotensioners can adjust the tension in the belt with a small movement of the pulley. In such a case, the rod 62 of the hydraulic damper cylinder 29 is not required to have so long a stroke, so that the sub-reservoir may be omitted.

The fourth to sixth embodiments are basically the same in operation as the first to third embodiments.

(SEVENTH EMBODIMENT)

Figure 11A:
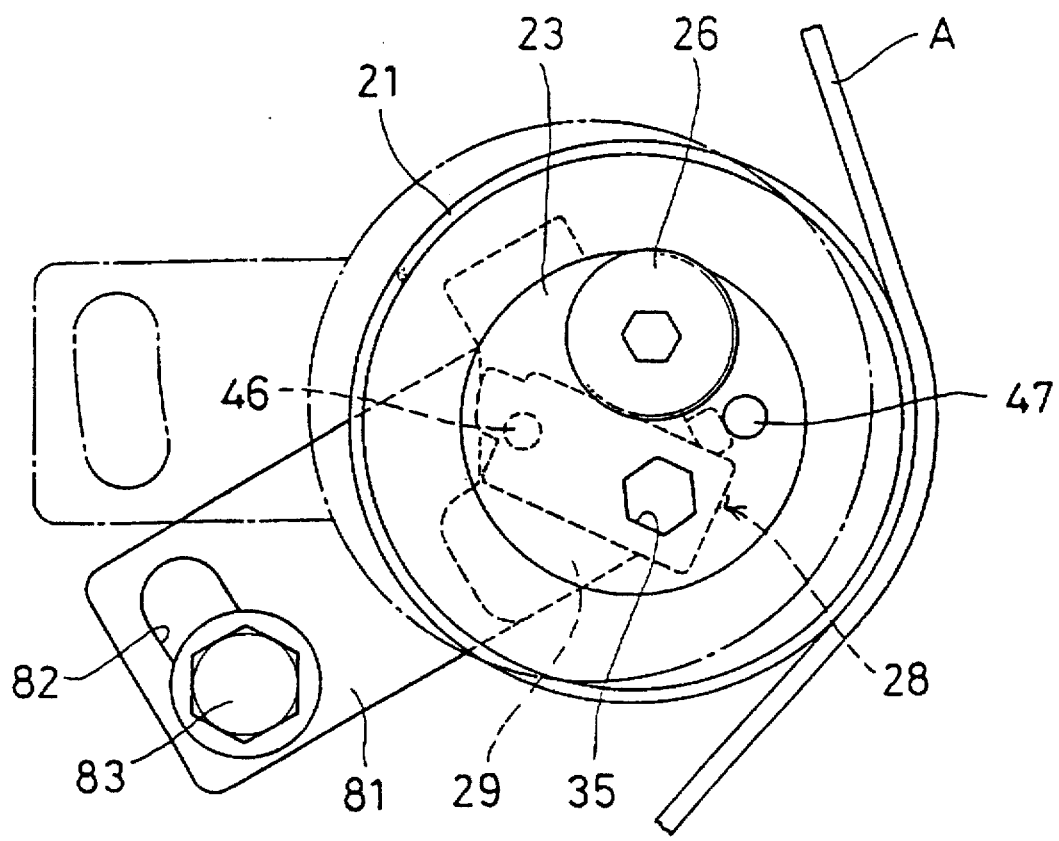
FIG. 11A is a front view of a seventh embodiment of the present invention.
Figure 11B:
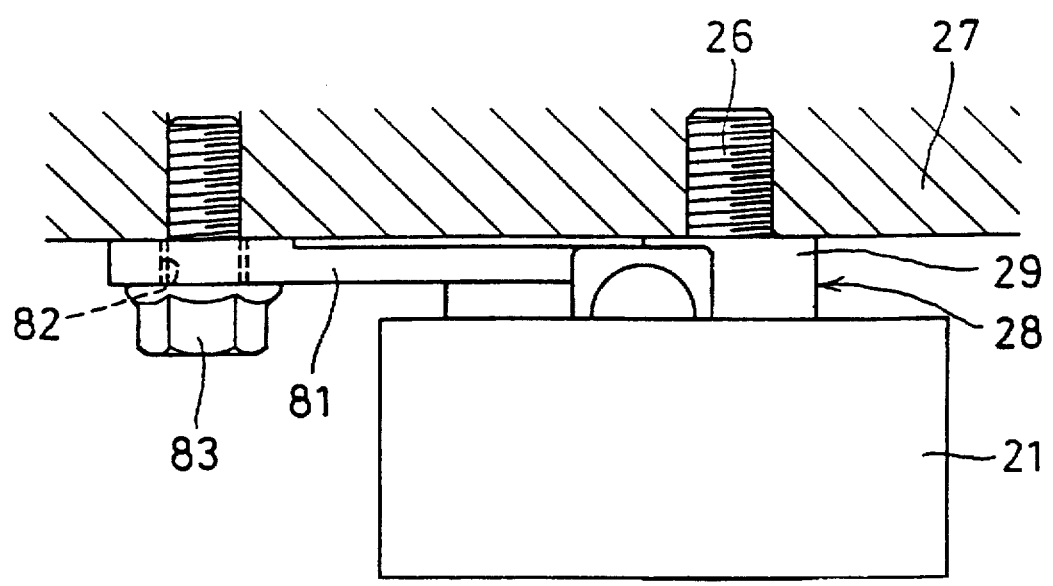
FIG. 11B is a plan view in cross-section of the embodiment illustrated in FIG. 11A.

The seventh embodiment shown in FIGS. 11A and 11B has a means for adjusting the initial tension when mounting the autotensioner on an engine. This damper has a positioning stay 81 which is an extension of the damper cylinder 29 and has an arcuate, elongated hole 82 in its distal end whose center is on the fixing bolt 26. A bolt 83 inserted through the hole 82 is threadedly fixed to the engine.

The fixing pin 47 has to be so short that it will not protrude from the mounting portion 34 of the damper cylinder 29 toward the engine block 27.

To mount the autotensioner on the engine block 27, the fixing bolt 26 is temporarily tightened with the respective members positioned as shown by chain lines in FIG. 11A. In this state, the belt A is put around the tension pulley 21. The eccentric ring 23 is then turned with a hexagon wrench inserted in the hexagonal hole 53 to press the tension pulley 21 against the belt A.

The tension in the belt A in this initial state varies dependent on the length of the belt A and the positional errors of the crankshaft and camshafts. To adjust the belt tension to an optimum value, the positioning stay 81 is moved e.g. to the position shown by solid line. It is then fixed to the engine block 27 by tightening the bolt 83 extending through the elongated hole 82. Lastly, the fixing bolt 26 is tightened.

As described above, according to the present invention, the hydraulic damper, which is sufficiently compact, is received entirely inside the outer periphery of the tension pulley, so that it is possible to minimize the space between the tension pulley and the engine block. The entire autotensioner thus takes up smaller installation space.

The tension adjusting spring is provided inside or on the outer side of eccentric ring. Namely, it is not provided in the space between the tension pulley and the engine block. Thus, it is possible to further reduce this space.

What is claimed is:

1. An autotensioner comprising:
   an eccentric ring;
   a tension pulley rotatably mounted on said eccentric ring for supporting a belt, said tension pulley having an outer periphery and an axis;
   a tension adjusting spring mounted on said eccentric ring for urging said eccentric ring in a first direction so as to pivot said eccentric ring; and
   a hydraulic damper arranged in a side-by-side relation with said tension pulley along said axis of said tension pulley,
   said hydraulic damper comprising a damper cylinder having a pressure chamber and a reservoir chamber, a pressure receiving member in engagement with said eccentric ring for damping rotary motion of said eccentric ring when tension in the belt increases, and a check valve provided between said pressure chamber and said reservoir chamber, wherein said hydraulic damper is arranged within said outer periphery of said tension pulley.

2. An auto tensioner as claimed in claim 1, further comprising a sub-reservoir chamber provided at a side of said damper cylinder and communicating with said reservoir chamber, wherein said pressure receiving member is axially movably mounted in said damper cylinder.

3. An autotensioner as claimed in claim 2, wherein an air space is present in said sub-reservoir chamber.

4. An autotensioner as claimed in claim 1, wherein an air space is present in said reservoir chamber.

5. An autotensioner comprising:

an eccentric ring;

a tension pulley rotatably mounted on said eccentric ring for supporting a belt, said tension pulley having an outer periphery and an axis;

a tension adjusting compression coil spring for urging said eccentric ring in a first direction so as to pivot said eccentric in said first direction;

a hydraulic damper comprising a damper cylinder having a pressure chamber and a reservoir chamber, a pressure receiving member in engagement with said eccentric ring for damping rotary motion of said eccentric ring when tension in the belt increases, and a check valve provided between said pressure chamber and said reservoir chamber, said hydraulic damper being arranged inside said outer periphery of said tension pulley; and a pin fixed to said damper cylinder and abutting one end of said compression coil spring.

6. An autotensioner comprising:

an eccentric ring;

a tension pulley rotatably mounted on said eccentric ring for supporting a belt, said tension pulley having an outer periphery and an axis;

a tension adjusting spring for urging said eccentric ring so as to pivot said eccentric ring in a first direction, wherein said tension adjusting spring is a torsion coil spring mounted on said eccentric ring so as to be disposed inside said outer periphery of said tension pulley;

a hydraulic damper comprising a damper cylinder having a pressure chamber and a reservoir chamber, a pressure receiving member in engagement with said eccentric ring for damping rotary motion of said eccentric ring when tension in the belt increases, and a check valve provided between said pressure chamber and said reservoir chamber, said hydraulic damper being arranged inside said outer periphery of said tension pulley; and a pin fixed to said damper cylinder, wherein said torsion coil spring has a first end in engagement with said eccentric ring and a second end in engagement with said pin.

7. An autotensioner comprising:

an eccentric ring;

a tension pulley rotatably mounted on said eccentric ring for supporting a belt, said tension pulley having an outer periphery and an axis;

a tension adjusting spring for urging said eccentric ring in a first direction so as to pivot said eccentric ring in said first direction; and a hydraulic damper comprising a damper cylinder having a pressure chamber and a reservoir chamber, a pressure receiving member protruding from said damper cylinder and engaging said eccentric ring for damping rotary motion of said eccentric ring when tension in the belt increases, and a check valve provided between said pressure chamber and said reservoir chamber, wherein said hydraulic damper is arranged inside of said outer periphery of said tension pulley, and said hydraulic damper is mounted such that a line, defined by a point about which said eccentric ring and said hydraulic damper pivot and a center of said pulley, forms an angle of 30° to 90° degrees with respect to a direction in which said pressure receiving member of said hydraulic damper protrudes from said damper cylinder.

\* \* \* \* \*